United States Patent
Gagnon et al.

(10) Patent No.: US 11,035,753 B2
(45) Date of Patent: Jun. 15, 2021

(54) TEST DEVICE WITH BOTH OTDR AND WDM POWER METER MODES

(71) Applicants: Jimmy Gagnon, Levis (CA); Michel Leclerc, Quebec (CA); Stephane Perron, Quebec (CA)

(72) Inventors: Jimmy Gagnon, Levis (CA); Michel Leclerc, Quebec (CA); Stephane Perron, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 16/815,105

(22) Filed: Mar. 11, 2020

(65) Prior Publication Data

US 2020/0292416 A1    Sep. 17, 2020

Related U.S. Application Data

(60) Provisional application No. 62/817,260, filed on Mar. 12, 2019, provisional application No. 62/929,317, filed on Nov. 1, 2019.

(51) Int. Cl.
| | | |
|---|---|---|
| *G01M 11/00* | (2006.01) | |
| *H04B 10/071* | (2013.01) | |
| *H04B 10/079* | (2013.01) | |

(52) U.S. Cl.
CPC ....... *G01M 11/3145* (2013.01); *H04B 10/071* (2013.01); *H04B 10/07955* (2013.01)

(58) Field of Classification Search
CPC .. G01M 11/30; G01M 11/31; G01M 11/3109; G01M 11/3145; G01M 11/3154; G01M 11/3163; G01M 11/3172; G01M 11/31281; G01M 11/319; G01M 11/33; G01M 11/332; G01M 11/333; G01M 11/335; G01M 11/336; G01M 11/337;
(Continued)

(56) References Cited

U.S. PATENT DOCUMENTS

| | | | |
|---|---|---|---|
| 8,411,259 B2 | 4/2013 | Levin et al. | |
| 8,576,389 B2* | 11/2013 | Perron | ............... G01M 11/3145 |
| | | | 356/73.1 |
| 9,423,316 B2* | 8/2016 | Perron | ............... G01M 11/3145 |

(Continued)

OTHER PUBLICATIONS 740C xWDM OTDR Series, C-BAND DWDM and 18-Wavelength CWDM Tunable OTDR Series for Metro Ethernet and C-RAN Link Characterization, 2018, 13 pages, EXFO Inc., Canada.
(Continued)

*Primary Examiner* — Gordon J Stock, Jr.
(74) *Attorney, Agent, or Firm* — Helene Chotard

(57) ABSTRACT

There is provided a test device and a test method that combine both tunable OTDR and WDM power meter functionalities into the same integrated optoelectronic test hardware, such that the tunable OTDR and the WDM power meter functions share optoelectronic components, thereby reducing the hardware cost and the overall form factor and weight of the test device. With the proposed configuration, both tunable OTDR and WDM power meter functionalities may be provided via a single test port to be connected to the optical fiber link under test. By connecting the fiber to a single test port, the number of manipulations to be performed by technicians is reduced and two tests can be performed in a single connection operation out of the same test port.

24 Claims, 9 Drawing Sheets

(58) Field of Classification Search
CPC .............. G01M 11/338; H04B 10/071; H04B 10/07955
See application file for complete search history.

(56) References Cited

U.S. PATENT DOCUMENTS

| | | | | |
|---|---|---|---|---|
| 9,641,243 | B2* | 5/2017 | Perron | H04B 10/071 |
| 9,831,948 | B2* | 11/2017 | Ruchet | H04B 10/079 |
| 10,270,554 | B2* | 4/2019 | Ruchet | H04J 14/02 |
| 10,491,296 | B1* | 11/2019 | Wellbrock | H04B 10/0771 |
| 10,887,012 | B1* | 1/2021 | Schneider | H04B 10/07957 |
| 10,914,655 | B2* | 2/2021 | Roux | H01L 21/76898 |
| 2020/0200645 | A1* | 6/2020 | Perron | G01M 11/3145 |

OTHER PUBLICATIONS

EXFO Releases High-Resolution Tunable DWDM OTDR to Expedite Troubleshooting of Metro Ethernet Links [online], Dec. 18, 2015, EXFO Inc., Quebec City, Canada. Retrieved from the Internet: <URL: https://www.exfo.com/en/corporate/news-events/press-releases/high-resolution-tunable-dwdm-otdr/>.
Product Brochure: Network Master Series MT9090A, Catalog No. MT9090A-E-A-1-(7.00), Jul. 12, 2011, 8 pages, Anritsu, Japan.
AE3100A~M Series, 2- and 4-Wavelength Handheld OTDR, Deviser Instruments Incorporated, 2018, 5 pages, San Jose, United States.
Optical Wave Expert, Measure, Diagnose and Troubleshoot on a Single Port, 2019, 7 pages, EXFO Inc., Canada.

* cited by examiner

TEST DEVICE WITH BOTH OTDR AND WDM POWER METER MODES

TECHNICAL FIELD

The present description relates to a test device for testing and/or troubleshooting wavelength division multiplexed (WDM) optical communication networks, such as, e.g., point-to-multipoint (P2MTP) access networks. More specifically, the description relates to a test device configured for operating in both a tunable OTDR mode and a WDM power meter mode.

BACKGROUND

Optical Time-Domain Reflectometry (OTDR—also used to refer to the corresponding device) is a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain and insertion loss of the fiber link under test, as well as each component along the link, can be characterized.

Tunable OTDR devices may be used for testing optical fiber links including MUX, DEMUX and/or OADM (see, e.g., EXFO's 740C-DWC). A tunable OTDR is based on a conventional OTDR optoelectronic configuration, except that the conventional pulsed laser source used to launch the pulsed OTDR test signal towards the optical fiber link under test is replaced by a tunable pulsed laser source. For example, the pulsed laser source may be tunable over channels of the C-band ITU DWDM grid.

In some tunable OTDR approaches (see, e.g., EXFO's 740C-DWC), a tunable filter may be positioned upstream of the detection circuit in order to filter out undesired optical power from other channels. Out of band optical power would otherwise introduce additional noise on the detected OTDR return signal.

WDM power meters (also known as "WDM channel checkers" or simply "channel checkers") are used in the telecommunication industry to monitor the presence of WDM channels on optical fiber links and/or measure the optical power of individual WDM channels. A WDM power meter device comprises a tunable filter employed to isolate one channel for which power is to be measured and filter out optical power coming from other channels. The tunable filter is positioned upstream of an optical power meter. Contrary to Optical Spectrum Analyzers (OSA), a WDM power meter cannot resolve the optical spectrum power of a signal within a WDM channel. It only measures the total optical power of individual WDM channels.

Technicians often need to use a plurality of test instruments when they are out in the field to test a new service or troubleshoot an existent one. For example, in some cases, they may need to carry multiple test devices up in a bucket truck to perform tests at the top of a utility pole. Compact and lightweight test devices are therefore desirable, and ideally, combined in a portable housing.

There therefore remains a need for a portable test device that combines an OTDR unit with other test functions required for WDM troubleshooting, into a single test device.

SUMMARY

There is therefore provided a test device that combines a tunable OTDR module and a WDM power meter module, integrated in single test unit, for WDM troubleshooting applications.

In accordance with one aspect, there is provided herein a test device and a test method that combine both tunable OTDR and WDM power meter functionalities into the same integrated optoelectronic test hardware, such that the tunable OTDR and the WDM power meter functions share optoelectronic components, thereby reducing the hardware cost and the overall form factor and weight of the test device. With the proposed configuration, both tunable OTDR and WDM power meter functionalities may be provided via a single test port to be connected to the optical fiber link under test. By connecting the fiber to a single test port, the number of manipulations to be performed by technicians is reduced and two tests can be performed in a single connection operation out of the same test port.

In accordance with one aspect, there is provided a test device comprising:
a test port connectable toward an optical fiber link;
a pulsed tunable laser source for generating and launching toward the optical fiber link and via said test port, a pulsed test signal within a selected wavelength-division multiplexed (WDM) channel;
a tunable optical filter receiving light from the optical fiber link via said test port, to filter out optical power outside of the selected WDM channel before detection;
a detection circuit connected to the tunable filter to detect light from the optical fiber link within the selected WDM channel;
an OTDR module configured to, in an OTDR mode, set an emission wavelength of the pulsed tunable laser source for generating a pulsed test signal in the selected WDM channel, set a center wavelength of the tunable filter within the selected WDM channel and acquire from the detection circuit, an OTDR trace representing backscattered and reflected light as a function of distance in the optical fiber link; and
a WDM power meter module configured to, in a WDM power meter mode, set the center wavelength of the tunable filter within the selected WDM channel and acquire from the detection circuit, an optical power value representing an optical power level of light from the optical fiber link within the selected WDM channel.

In accordance with another aspect, there is provided a test method for testing an optical fiber link using a test device having a WDM power meter module and an OTDR module, the test method comprising:
in an OTDR mode:
setting an emission wavelength of a pulsed tunable laser source for generating a pulsed test signal in a selected wavelength-division multiplexed (WDM) channel;
using the pulsed tunable laser source to generate and launch toward the optical fiber link, a pulsed test signal within a selected WDM channel, via a test port connectable toward the optical fiber link;
setting a center wavelength of a tunable filter within the selected WDM channel;
using the tunable optical filter receiving light from the optical fiber link via said test port, to filter out optical power outside of the selected WDM channel before detection; and
using a detection circuit connected to the tunable filter to acquire an OTDR trace representing backscattered and reflected light as a function of distance in the optical fiber link; and
in a WDM power meter mode:
setting the center wavelength of the tunable filter within the selected WDM channel;

using the tunable optical filter receiving light from the optical fiber link via said test port, to filter out optical power outside of the selected WDM channel before detection; and in absence of the pulsed test signal, using a detection circuit connected to the tunable filter to acquire an optical power value representing an optical power level of light from the optical fiber link within the selected WDM channel.

In the provided test device and test method, the OTDR and the WDM power meter share the same tunable optical filter in order to implement both functions in a more compact and lightweight test device than if implemented separately. Sharing the same tunable optical filter to implement both functions also reduced the hardware cost of the combined unit.

Both tunable OTDR and WDM power meter functionalities may be provided via a single test port to be connected to the optical fiber link under test. By connecting the fiber to a single test port, the number of manipulations to be performed by technicians is reduced because two tests can be performed in a single connection operation out of the same test port. It also saves the user from having to select which test port to connect to the optical fiber link and helps avoid manipulation errors where the optical fiber link would be connected to the wrong test port.

In accordance with another aspect, there is provided a test method for testing an optical fiber link using test device having a WDM power meter module and an OTDR module, the method comprising:

using the WDM power meter module:

for each of a set of WDM channels, measuring an optical power value representing an optical power level of light from the optical fiber link within the corresponding WDM channel;

comparing measured optical power values to a power level threshold;

based upon a determination that an optical power value measured for at least one WDM channel is not null and is less than said power level threshold:

the OTDR module performing at least one OTDR acquisition toward the optical fiber link to acquire an OTDR trace representing backscattered and reflected light as a function of distance in the optical fiber link.

In accordance with another aspect, there is provided a test device for testing an optical fiber link, comprising:

a test port connectable toward an optical fiber link;

a pulsed tunable laser source configured to, in an OTDR mode, generating and launching toward the optical fiber link and via said test port, a pulsed test signal;

an optical filter receiving light from the optical fiber link via said test port and configured to filter out optical power outside of a selected WDM channel before detection;

a detection circuit connected to the optical filter and configured to detect light from the optical fiber link within the selected WDM channel;

an OTDR module configured to, in the OTDR mode, acquire from the detection circuit, an OTDR trace representing backscattered and reflected light as a function of distance in the optical fiber link;

a WDM power meter module configured to, in a WDM power meter mode, for each of a set of WDM channels, measure an optical power value representing an optical power level of light from the optical fiber link within the corresponding WDM channel;

a test device controller configured to:

compare measured optical power values to a power level threshold; and based upon a determination that the optical power value measured for at least one WDM channel is not null and is less than said power level threshold: triggering the OTDR mode to perform at least one OTDR acquisition toward the optical fiber link.

In this specification, the qualifier WDM or Wavelength Division Multiplexed is intended to encompass any wavelength division multiplexed arrangement including, without limitation, DWDM channels of the C-band ITU-T G694.1 grid, i.e. including either 50 GHz or 100 GHz increments, as well as Coarse WDM (CWDM) channels of the ITU-T G.694.2 grid.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

Further features and advantages of the present invention will become apparent to those of ordinary skill in the art upon reading of the following description, taken in conjunction with the appended drawings.

BRIEF DESCRIPTION OF THE DRAWINGS

It will be noted that throughout the drawings, like features are identified by like reference numerals.

It should also be understood that when the appended drawings are denoted as schematics, elements of the drawings are not necessarily drawn to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

Figure 1:
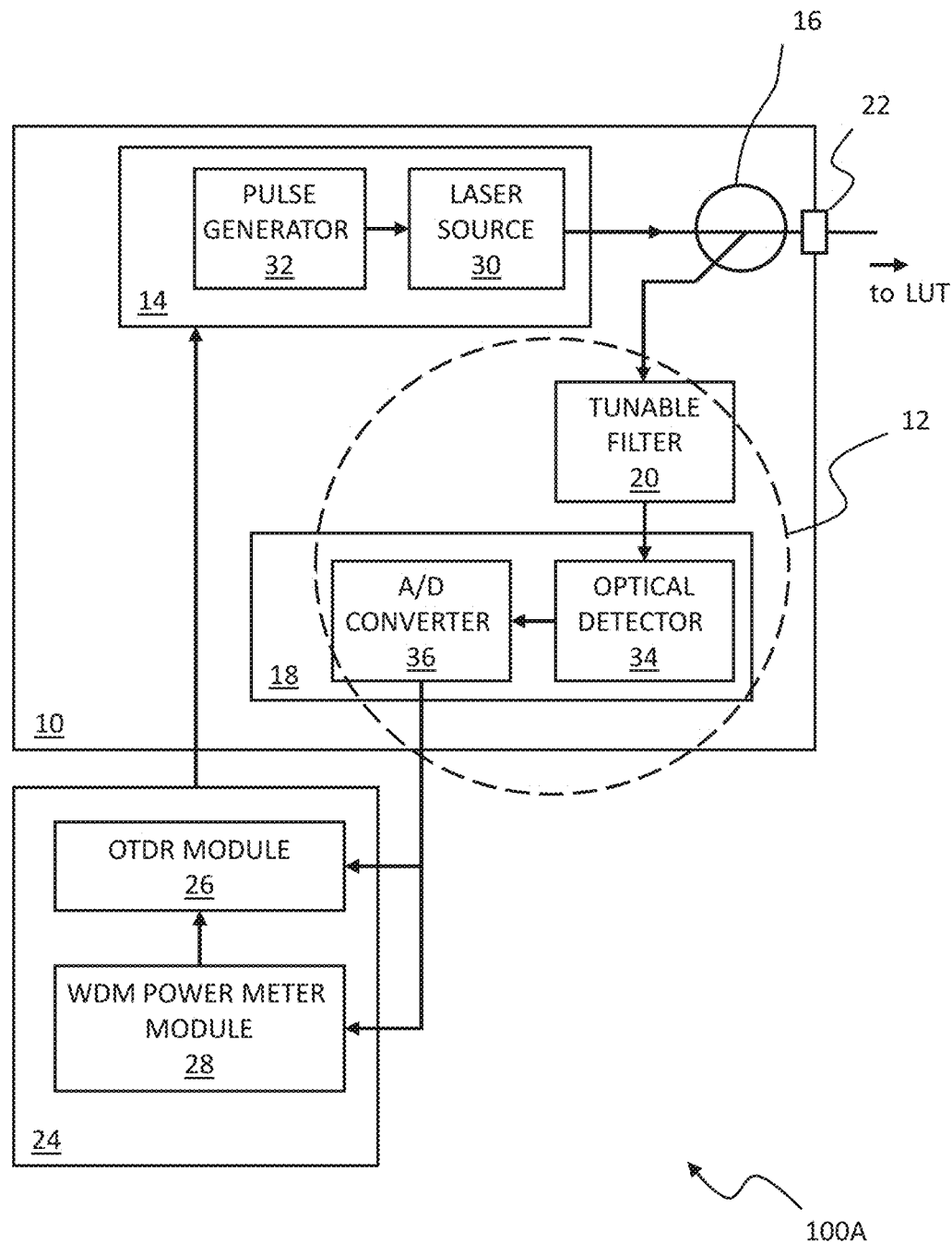
FIG. 1 is a block diagram illustrating a test device in accordance with one embodiment wherein an OTDR unit and a WDM power meter unit share the same tunable optical filter and optical detector.

Now referring to the drawings, FIG. 1 shows an embodiment of a test device 100A having dual modes of operation, i.e. as a tunable OTDR and a WDM power meter. In the test device 100A, some of the optoelectronic components of a tunable OTDR unit 10 are reused to implement a WDM power meter unit 12. More specifically, the tunable OTDR unit 10 comprises a pulsed tunable laser source 14, a coupler 16 such as an optical circulator or a power coupler, a detection circuit 18 and a tunable filter 20 positioned upstream of the detection circuit 18.

The pulsed tunable laser source 14 generates a pulsed test signal within a selected wavelength-division multiplexed (WDM) channel, which is launched toward the optical fiber link under test via a test port 22. The WDM power meter unit 12 is implemented by re-using the detection circuit 18 and the tunable filter 20 of the OTDR unit 10 such that the tunable OTDR unit 10 and the WDM power meter unit 12 share these optoelectronic components. When the pulsed tunable laser source 14 of the OTDR unit 10 is turned off, the test device 100A can be operated in a WDM power meter mode wherein the tunable filter 20 and the detection circuit 18 are used to measure the optical power of WDM communication signals received at the test port 22.

In conventional tunable OTDR approaches, there is no requirement for a tunable filter 20 positioned upstream of the detection circuit 18. However, when included in the tunable OTDR 10, such tunable filter 20 is advantageously employed to filter out undesired optical power from other channels before the OTDR return signal reaches the detection circuit 18. Out of band optical power would otherwise introduce additional noise on the detected OTDR return signal.

The test device 100A further comprises one or more processing units 24 embodying an OTDR module 26 and a WDM power meter module 28 to implement OTDR and WDM power meter modes of operation, respectively.

The pulsed tunable laser source 14 is embodied by a tunable laser source 30, such as a tunable laser, driven by a pulse generator 32 to generate the test signal comprising test light pulses having desired characteristics. As known in the art, the pulsed tunable laser source 14 is adapted to generate test light pulses of varied pulse widths, repetition periods and optical power through a proper control of the pattern produced by the pulse generator 32. In this embodiment, the laser source 30 is tunable, so as to generate test light pulses having varied wavelengths. As such, the tested WDM channel may be selected by tuning the laser source 30 to the relevant wavelength corresponding to the selected WDM channel. It will be understood that the pulsed tunable laser source 14 may combine both pulse width and wavelength controlling capabilities. Of course, different and/or additional components may be provided in the pulsed tunable laser source 14, such as modulators, lenses, mirrors, optical filters, wavelength selectors and the like.

The pulsed tunable laser source 14 is coupled to the test port 22 of the test port 22 through a coupler 16, such as a circulator, having three or more ports or a power coupler. The first port is connected to the pulsed tunable laser source 14 to receive the test signal therefrom. The second port is connected toward the test port 22. The third port is connected to the tunable filter 20 which output is connected to the detection circuit 18. The connections are such that, in OTDR mode, test signal generated by the pulsed tunable laser source 14 are coupled to the test port 22 and that the return light signal arising from backscattering and reflections along the optical fiber link is coupled to the detection circuit 18 after undergoing filtering by the tunable optical filter 20.

The tunable optical filter 20 may be implemented using a band-pass wavelength filter combined with a tuning mechanism that is able to tune a central wavelength thereof to a selected WDM channel. A bandwidth of the wavelength filter (such as the 3-dB bandwidth) is typically selected to encompass the channel width of the selected WDM channel, while mostly rejecting light outside of the selected WDM channel. The specific bandwidth therefore depends upon the intended application. As known in the art, the tunable optical filter 20 may comprise, e.g., one or more thin film filters, one or more filtering lenses and/or one or more fiber Bragg gratings, tuned with the action of a microelectromechanical system (MEMS), thermoelectric system (TEC) or other means such as a step motor.

The detection circuit 18 comprises at least one optical detector 34, such as a photodiode, an avalanche photodiode or any other suitable photodetector, and at least one analog-to-digital converter 36.

The optical detector 34 detects light from the optical fiber link within the WDM channel as selected via the tunable optical filter 20. The analog-to-digital converter 36 converts an electrical signal that is proportional to the detected light from analog to digital in order to allow processing by the processing unit 24. It will be understood that the electrical signal may of course be amplified, filtered or otherwise processed before analog to digital conversion.

In OTDR mode, the detection circuit 18 detects the return light signal corresponding to each test light pulse. The power level of return light signal as a function of time, which is obtained from the detection and conversion above, is referred to as one acquisition of an OTDR trace.

Of course, the OTDR unit 10 may also be used to perform multiple acquisitions with varied pulse widths to obtain a multi-pulsewidth OTDR measurement. The thereby obtained OTDR traces will be typically stored in a data store (not shown) for further processing.

In WDM power meter mode, the pulsed tunable laser source 14 is turned off and any light that may be propagating in the optical fiber link under test is received at test port 22. The WDM power meter unit is used to measure an optical power level of light that is present within a selected WDM channel, as selected by the tunable optical filter 20. The detection circuit 18 outputs an optical power value representing an optical power level of light from the optical fiber link within the selected WDM channel.

The OTDR module 26 is configured to, in an OTDR mode, set an emission wavelength of the pulsed tunable laser source for generating a pulsed test signal in the selected WDM channel and set a center wavelength of the tunable filter within the selected WDM channel. It may control the acquisition conditions for each light acquisition, by controlling the pulsed tunable laser source 14 to generate test light pulses having variable pulse widths, repetition periods, wavelengths and/or optical power. It is further configured to acquire OTDR traces from the output of the detection circuit 18. The OTDR module 26 may comprise an OTDR manager 54 and may optionally comprise an OTDR analyzing module 58 (see FIG. 4).

The WDM power meter module 28 is configured to, in a WDM power meter mode, set the center wavelength of the tunable filter within the selected WDM channel and acquire from the detection circuit, optical power values representing an optical power level of light from the optical fiber link within the selected WDM channel, in absence of OTDR test signal. The WDM power meter module 28 may comprise a WDM power meter manager 56 and may optionally comprise a WDM power meter analyzing module 60 (see FIG. 4).

Figure 2:
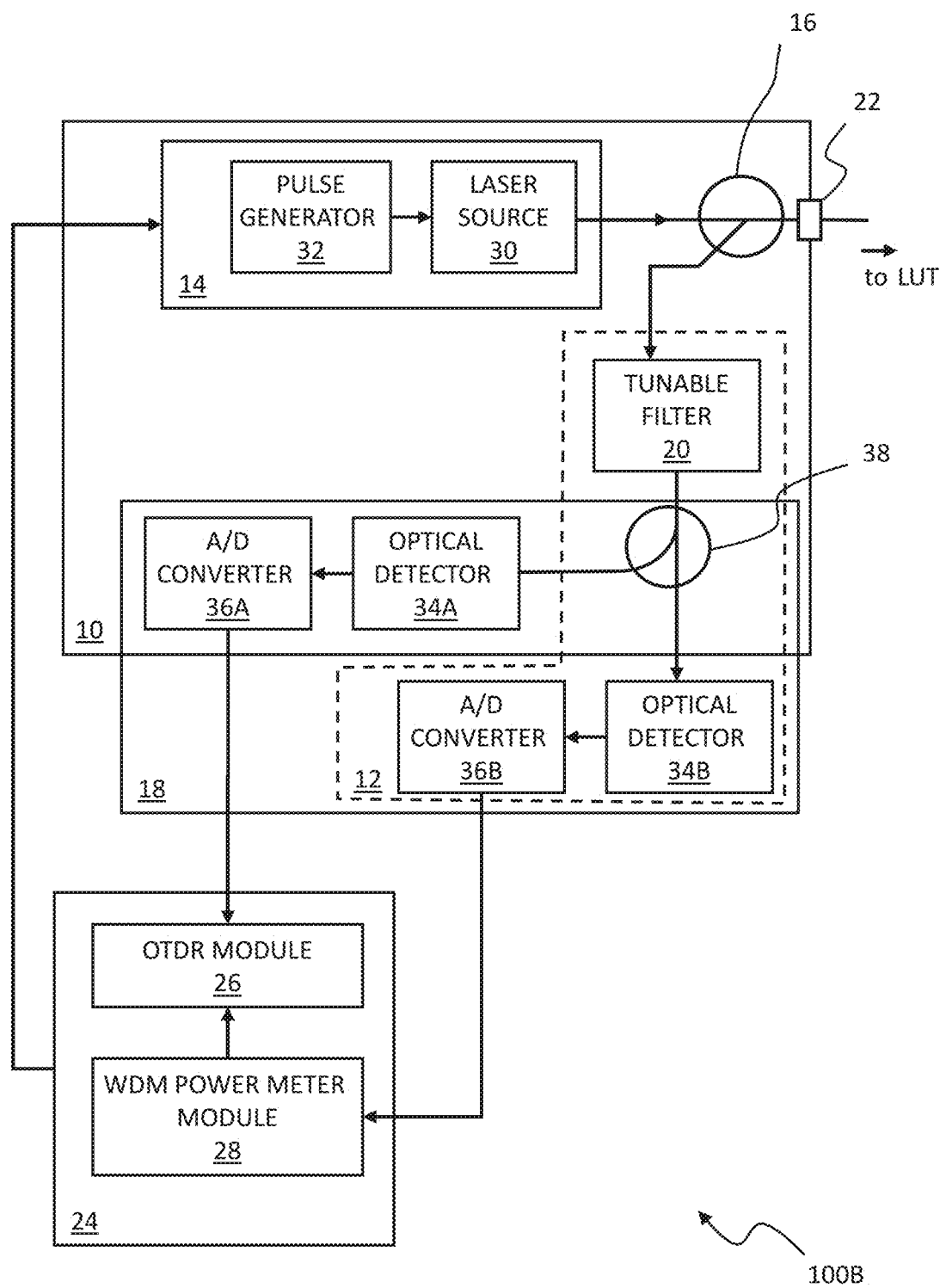
FIG. 2 is a block diagram illustrating a test device in accordance with another embodiment wherein an OTDR unit and a WDM power meter unit share the same tunable optical filter but use distinct optical detectors.

Now referring to FIG. 2, there is shown another embodiment of a test device 100B having dual modes of operation, i.e. as a tunable OTDR and a WDM power meter. The test device 100B of FIG. 2 has components and features that are similar to those of the test device 100A of FIG. 1 and, for more conciseness, such similar components and features are not repeatedly described.

In the embodiment of FIG. 2, only the tunable filter 20 of the OTDR unit 10 is being re-used to implement a WDM power meter unit 12. In this embodiment, distinct optical detectors 34A and 34B are used for implementing the OTDR unit 10 and the WDM power meter 12. For example, the optical detector 34A of the OTDR unit 10 may be implemented as an avalanche photodiode (APD) or any other photodetector suitable for OTDR measurements, and the optical detector 34B be implemented as a p-n junction photodiode such as a PIN photodiode for example. In this embodiment, an optical power splitter 38, such as a 90/10, 80/20 or 50/50 power coupler, splits the optical signal at the output of the tunable filter 20 towards the optical detectors 34A and 34B. In other embodiments, it may be envisaged to use an optical switch instead of the optical power splitter 38.

A first analog-to-digital converter 36A may then be associated with optical detector 34A and a second analog-to-digital converter 36B associated with optical detector 34B. A distinct optical detector 34B may allow better power measurement specifications by selecting a photodetector that is more suitable for power meter measurements, in contrast with OTDR measurements. It is noted that, in order to record reliable absolute values of optical power in the WDM power meter mode, a calibration of the optical detector 34B may be needed over the wavelength range covered by the WDM power meter, a calibration that may not be necessary for OTDR measurements, tunable or not, for which only relative values are relevant.

The configuration of FIG. 2 may also allow the implementation of a feedback loop in OTDR mode, according to which the center wavelength of the tunable filter 20 may be adjusted to maximize the detected optical power. Conversely, such feedback loop cannot be used in WDM power meter mode because it is not a priori known whether there is optical power or not in the relevant channel. The tunable filter 20 may therefore be calibrated (e.g at factory) over the wavelength range covered by the WDM power meter so as to register a conversion table of the center wavelength vs the tunable filter control signal.

Figure 3:
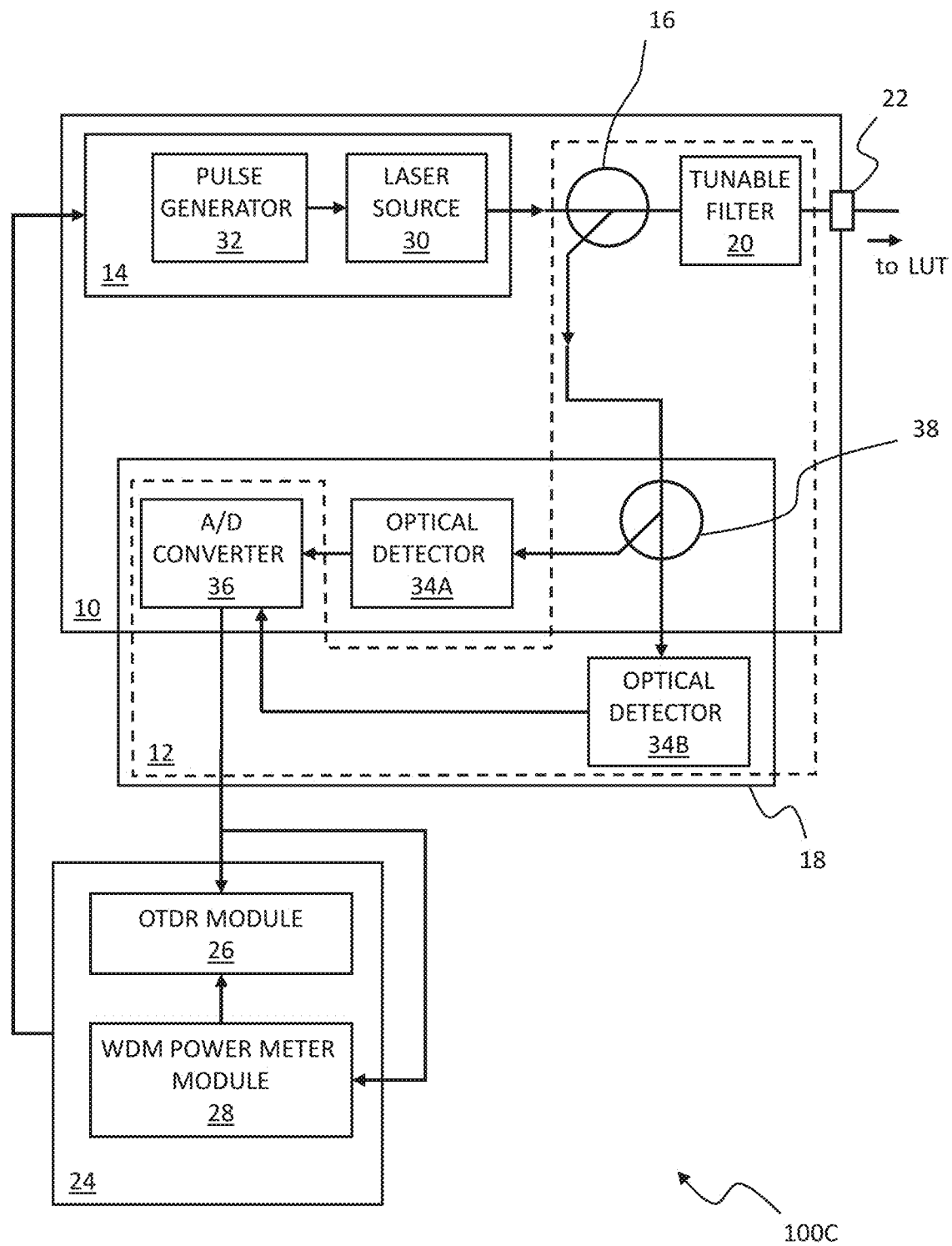
FIG. 3 is a block diagram illustrating a test device in accordance with yet another embodiment wherein an OTDR unit and a WDM power meter unit share the same tunable optical filter, which is connected toward to test port of the test device.

FIG. 3 shows yet another embodiment of a test device 100C having dual modes of operation, i.e. as a tunable OTDR and a WDM power meter. The test device 100C of FIG. 3 comprises components and features that are similar to those of the test devices of FIGS. 1 and 2 and, for more conciseness, such similar components and features are not repeatedly described.

In the embodiment of FIG. 3, the tunable optical filter 20 of the OTDR unit 10 is connected between the coupler 16 and the test port 22, such that the OTDR test signal and the return light signal are filtered. Such a position of the tunable optical filter 20 also allows it to be re-used to implement the WDM power meter unit 12.

In this embodiment, distinct optical detectors 34A and 34B are used for implementing the OTDR unit 10 and the WDM power meter 12 but a single analog-to-digital converter 36 is used for both optical detector 34A and optical detector 34B. For example, the analog-to-digital converter 36 may have two analog input ports or an analog switch may be used to select the signal, i.e. the output of optical detector 34A or 34B, being directed to the analog-to-digital converter 36 in accordance with the active operation mode of the test device, i.e. OTDR mode or WDM power meter mode.

In yet another embodiment (not illustrated), in the case of Coarse WDM (CWDM), the tunable laser source 30 of FIG. 1, 2 or 3 may be obtained by including a plurality of non-tunable lasers, the output signals of which being combined toward the test port 22 using a WDM filter. The laser source 30 may then be made tunable by driving the non-tunable lasers to selectively turn on one non-tunable laser at a time.

Figure 4:
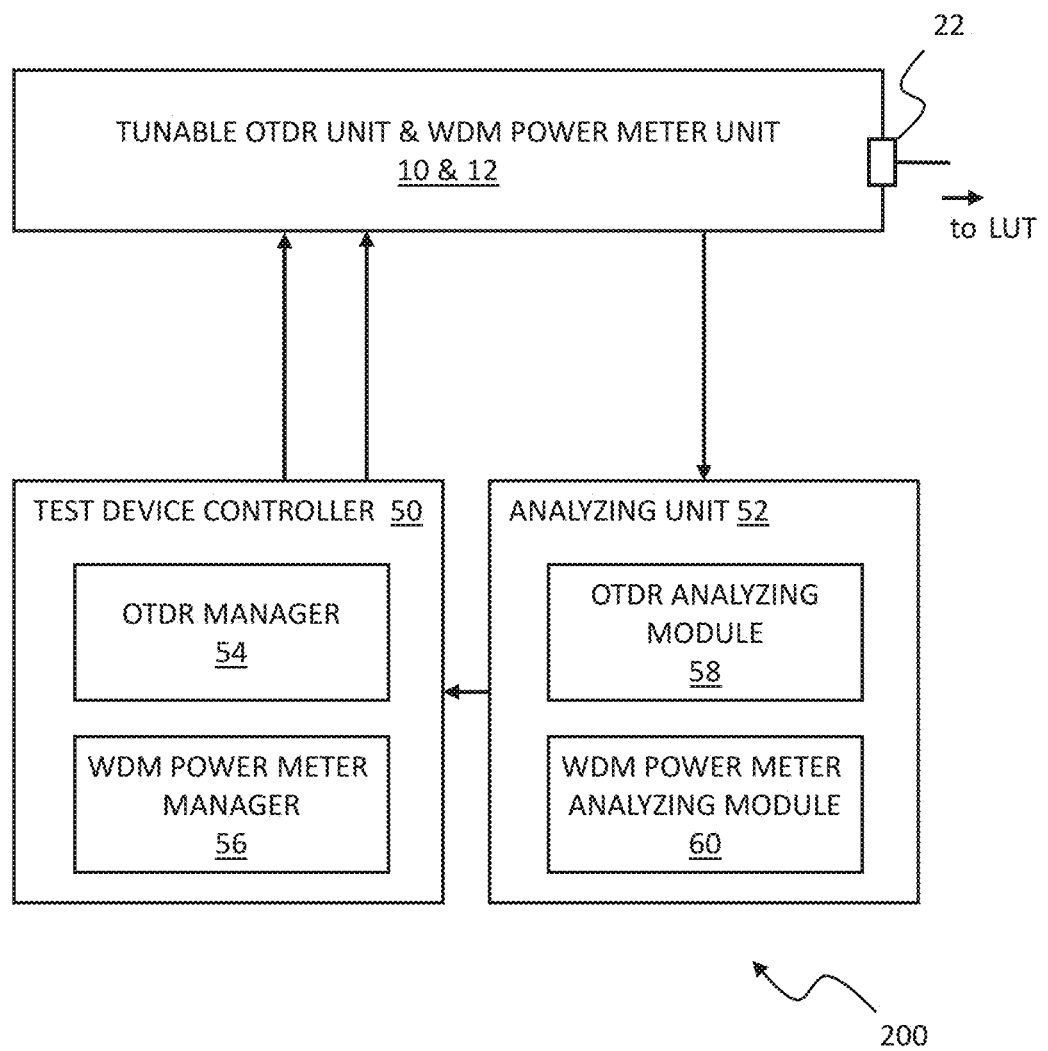
FIG. 4 is a block diagram illustrating in more detail an example implementation of the OTDR module and the WDM power meter module of the test devices of FIGS. 1 and 2.

FIG. 4 shows in more detail an example implementation of the OTDR module 26 and the WDM power meter module 28 of the test devices 100A, 100B and 100C of FIGS. 1A, 1B and 1C. The test device of FIG. 4 comprises the optoelectronic components described hereinabove of the tunable OTDR unit 10 and the WDM power meter unit 12, comprising a tunable laser source 14, a coupler 16, a tunable optical filter 20 and a detection circuit 18 (see FIGS. 1A, 1B and 1C). The dual mode test device further comprises a test device controller 50 to control the operation and wavelength setpoint of the tunable laser source 14 and the tunable optical filter 20, and an analyzing unit 52 to analyze data acquired by the test device. Both the test device controller 50 and the analyzing unit 52 may be embodied in a combination of hardware and/or a software program running on one or more processing units.

The test device manager 50 comprises an OTDR manager 54 employed in OTDR mode to set a center wavelength and manage operation of the tunable laser source 14 for generating an OTDR pulsed test signal in the relevant WDM channel; set the center wavelength of the tunable optical filter 20 to align it to the relevant WDM channel and test signal and acquire from the detection circuit 18, OTDR traces by transferring data from the detection circuit 18 into memory. The power level of return light signal acquired as a function of time is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace. It will also be understood that other factors may need to be controlled during the light acquisitions or from one light acquisition to the next, such as gain settings, pulse power, etc. as is well known to those skilled in the art.

It further comprises a WDM power meter manager 56 employed in WDM power meter mode to set the center wavelength of the tunable optical filter 20 and align it to the relevant WDM channel; acquire from the detection circuit 18, an optical power value representing an optical power level of light from the optical fiber link within the selected WDM channel by transferring data from the detection circuit 18 into memory.

One skilled in the art will readily understand that in the context of OTDR methods and systems, each optical power acquisition generally involves multiple acquisitions over a given period and averaging the results, in order to improve the sensitivity. In this case, the result obtained from averaging is herein referred to as an optical power value.

During WDM power meter mode, the tunable laser source is turned off. The OTDR mode and the WDM power meter mode are therefore not be operated simultaneously. The test device manager 50 may therefore further coordinate these operation modes.

The WDM power meter manager 56 may further be configured to repeat optical power value acquisitions for a plurality of WDM channels, as preconfigured by the user.

The analyzing unit 52 comprises an OTDR analyzing module 58 and a WDM power meter analyzing module 60.

In OTDR mode, the OTDR analyzing mode 58 receives one or more OTDR traces and performs the necessary calculations to characterize therefrom the optical fiber link under test.

The events are typically characterized in terms of location, insertion loss and reflectance characteristics while optical fiber segments may be characterized in terms of length and attenuation parameters. The OTDR analyzing mode 58 may be embodied by an analyzing software that performs the calculations necessary to characterize events along the optical fiber link. For example, in some embodiments, the analyzing software may identify events along the optical fiber link through analysis of one or more OTDR traces, and estimate a value of at least one characteristic associated with each of the one or more events.

In WDM power meter mode, the WDM power meter analyzing module 60 receives optical power values measured by the detection circuit 18 and records optical power values associated with relevant WDM channel(s).

Test results generated by the OTDR analyzing module 58 and/or the WDM power meter analyzing module 60 may be displayed on a display screen or otherwise be made available to the user.

It is noted that, although shown in FIG. 4 as being part of the test device 200, the analyzing unit 52 may be made integral, partially external or totally external to the test device 100A, 100B or 100C used to perform acquisitions.

There is therefore provided a test device which uses the optoelectronic components of a tunable OTDR to create a WDM power meter via the OTDR test port. This allow the field technicians to perform, via a single test port, two different troubleshooting tasks: checking the physical optical fiber integrity using the OTDR mode and measuring the power level of each channel using the WDM power meter mode. These two tools are a necessity for the repair technicians and otherwise require two separate units, two separate tests and two connections with cleaning in-between.

Figure 5:
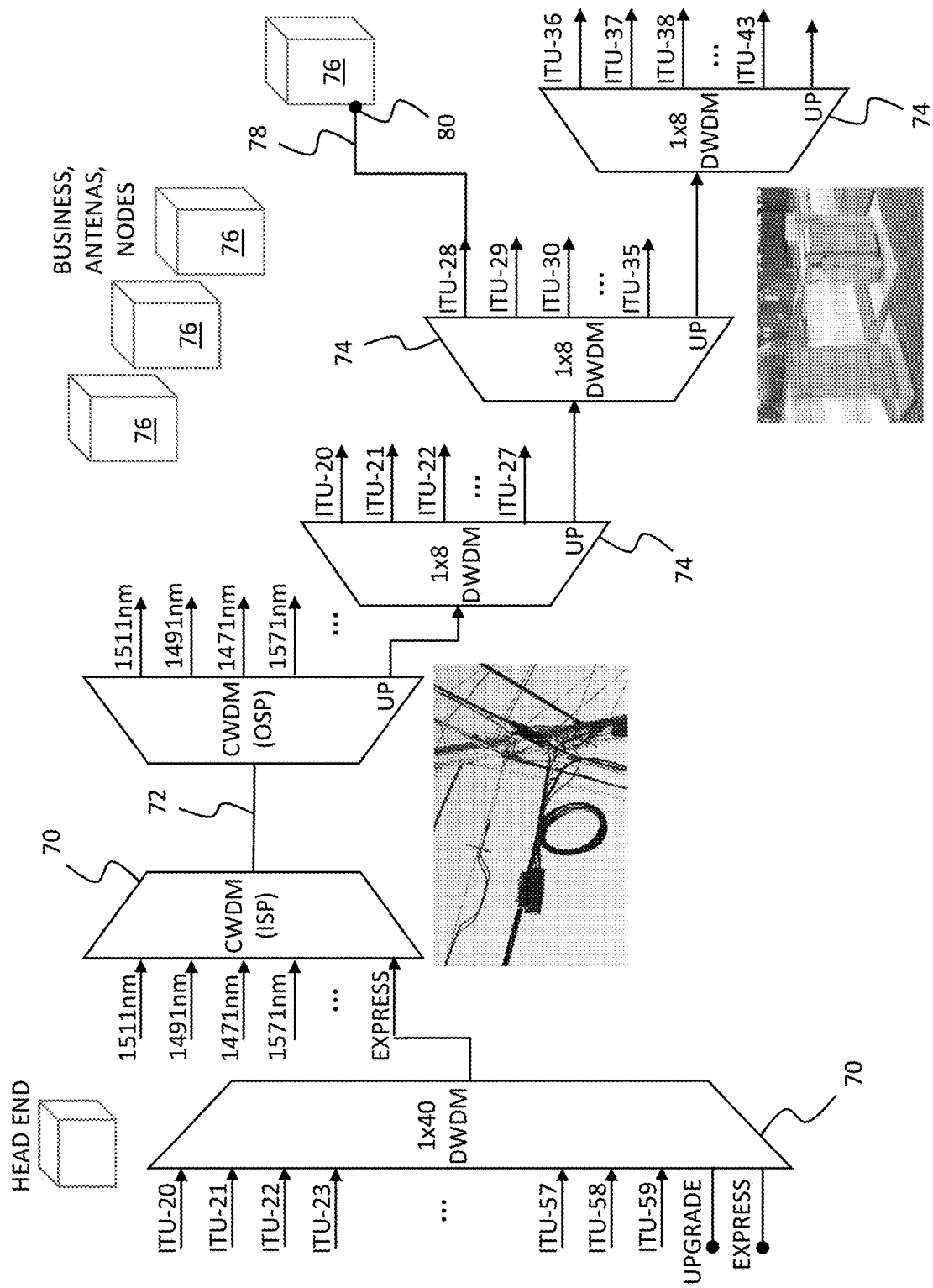
FIG. 5 is schematic illustrating an example embodiment of a point-to-multipoint (P2MTP) access network, used to illustrate example use cases for the test devices of FIGS. 1 to 4.

Some potential and non-limitative use cases are now described with reference to FIG. 5 which illustrates a point-to-multipoint (P2MTP) access network.

The point-to-multipoint (P2MTP) access network comprises one or more WDM add/drop multiplexers 70 at a head-end of the network, in order to propagate multiple WDM channels (e.g. ITU-20 to ITU-59 and/or CWDM channels) over a single optical fiber 72, as well as one or more WDM add/drop multiplexers 74 at customer nodes, to route each WDM channel toward its respective client or node 76 (such as a business client, a home client, an antenna, etc.). A drop cable 78 may be used to carry the client-specific WDM channel from WDM add/drop multiplexers 74 to the network access point 80 on client's premises 76.

In a first use case, a technician goes to the client premises 76 to either commission a new connection or troubleshoot a problem affecting the client's signal. The technician is equipped with a test device having dual modes of operation, i.e. as a tunable OTDR and a WDM power meter, such as the test device of FIG. 1, 2, 3, 4 or 7. It is noted that in some applications of this use case, a single WDM channel is expected to be present at the access point 80. The technician connects the test device toward the drop cable 78 that reaches the access point 80 in order to test the received signal. The WDM power meter mode can be used to detect the live WDM channel present on the drop cable 78 and measure its associated optical power level.

Of note is that in some applications, the drop cable 78 may comprise a downlink fiber and an uplink fiber. No live signal is expected on the uplink fiber. The WDM power meter mode can detect the live WDM channel present on the downlink fiber but will not detect any signal if launched on the uplink fiber.

If the optical power value measured for the live WDM channel is determined to meet a pass-fail criterion (i.e. the optical power value is above a given pass/fail threshold), it can be determined that there is no issue with the physical layer of the connection.

If the WDM power measurement shows that no live channel is found on the drop cable 78 (downlink fiber), there may be an issue with the physical layer. An OTDR measurement may then be launched toward the drop cable 78 to troubleshoot the optical fiber link, at least for the drop cable 78. In that case, the OTDR unit may be tuned to a WDM channel that is preconfigured, set by the user or defined by a test job configuration. For example, the emission wavelength may be selected within a WDM channel that is expected to be present on the drop cable 78.

If the WDM power measurement shows that live channel is found on the drop cable 78 but if the optical power value measured for the live WDM channel is determined to fail a pass-fail criterion (i.e. the optical power value is less than a given pass/fail threshold), the physical layer may be at cause of an issue. An OTDR measurement may then be launched toward the drop cable 78 to troubleshoot the optical fiber link, at least for the drop cable 78.

In this last case, if a tunable OTDR is used, it may be tuned to the live channel. If the optical power level in live channel is low enough to not interfere with the OTDR signal, such OTDR measurement may allow to characterize not only the drop cable 78 but also at least the connection to the WDM add/drop multiplexer 74 and potentially some part of the optical fiber link beyond. This is possible because an OTDR test signal that is tuned to the specific WDM channel of the client can propagate beyond the WDM add/drop multiplexer 74. An OTDR measurement launched at a wavelength that is outside of the WDM channel of the client would not go beyond the WDM add/drop multiplexer 74.

If more than one WDM channel does not meet the threshold, the OTDR unit may be tuned to one of these channels. In one embodiment, the OTDR is tuned to the channel having the lowest power, which may offer better test conditions for OTDR detection circuits.

In case the WDM power measurement shows that more than one live channel is found on the drop cable 78 but if the optical power values measured for the live WDM channels are determined to fail a pass-fail criterion (i.e. the optical power value is less than a given pass/fail threshold), the physical layer may be at cause of an issue. An OTDR measurement may then be launched toward the drop cable 78 to troubleshoot the optical fiber link, at least for the drop cable 78. In this case, if a tunable OTDR is used, it may be tuned to one of the live channels with low power (preferably that with the weakest optical power), in order to characterize not only the drop cable 78 but also at least some part of the optical fiber link beyond the WDM add/drop multiplexer 74.

It will be understood that the above-described use case may be advantageously implemented using a test device having dual modes of operation, i.e. as a tunable OTDR and a WDM power meter, performed via a single test port. In such cases, the test device controller 50 may be configured to automatically switch to OTDR mode and launch an OTDR acquisition within one or more identified WDM channels if a power level measured in WDM power meter mode does not meet a predetermined optical power level criterion (i.e. the optical power value is less than a given pass/fail threshold).

For example, in one embodiment, the test device controller 50 may comprise an automatic troubleshooting mode. In automatic troubleshooting mode, the test device controller 50 launches a WDM power measurement to read the power level of all relevant WDM channels. If, among the live WDM channels, the test device controller 50 determines that at least one channel does not meet a predetermined optical power level criterion, it automatically launches an OTDR measurement to troubleshoot.

A similar approach may still be used in the case of a test device having dual modes of operation provided via distinct test ports. In such a case, the automatic troubleshooting mode may launch a WDM power measurement to read the power level of all relevant WDM channels via a WDM power meter port. If the test device controller determines that at least one channel does not meet a predetermined optical power level criterion, it may prompt the user to connect the optical fiber link under test toward the OTDR test port before launching an OTDR acquisition.

It is noted that care should be taken when launching an OTDR acquisition within a live WDM channel because, under some conditions, an OTDR test signal may cause damages to a transceiver device located at the remote end of the optical fiber link under test. In order to prevent such potential damages, the test device controller 50 may comprise a safe mode as described in U.S. Pat. No. 9,641,243 to Perron, which is hereby incorporated by reference. In such as safe mode, the optical power of the OTDR test signal (i.e. the pulse energy, the average power and/or the maximum peak pulse power) is increased in steps until the far end of the optical fiber link is reached.

Figure 6A:
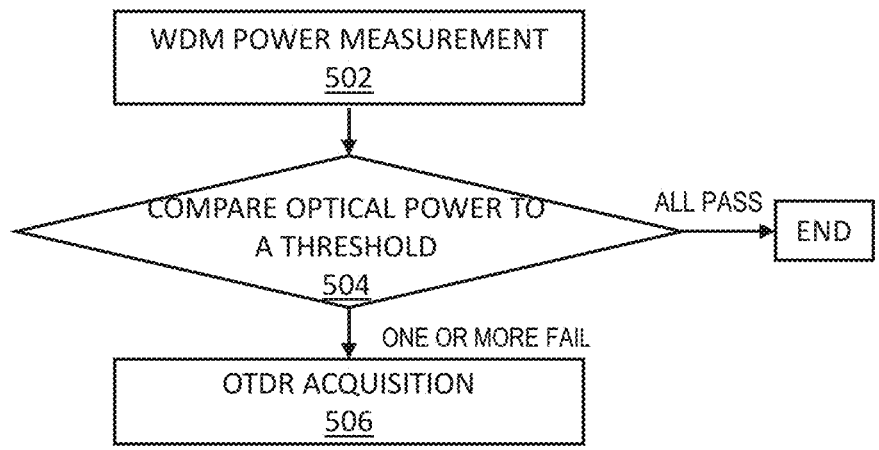
FIG. 6 comprises FIG. 6A and FIG. 6B, which are flowcharts illustrating a test method that automates the launch of an OTDR measurement upon the result of a WDM power measurement.
Figure 6B:
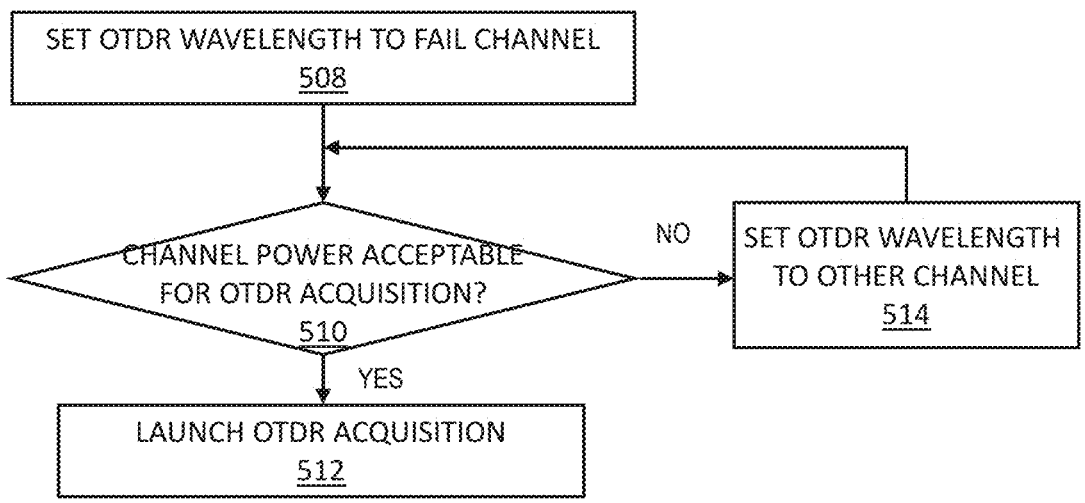

FIG. 6 comprises FIG. 6A and FIG. 6B and illustrates a test method that automates the launch of an OTDR measurement upon the result of a WDM power measurement. The method of FIG. 6 may be used, for example, to implement the use case described with reference to FIG. 5. The method of FIG. 6 may be embodied, for example, in any one of the test devices of FIG. 1, 2, 3, 4 or 7, e.g., within the test device controller 50.

Referring to FIG. 6A, in step 502, a WDM power measurement is performed. More specifically, using the WDM power meter module and for each of a set of WDM channels, an optical power value representing an optical power level of light from the optical fiber link under test within the corresponding WDM channel is measured. The set of WDM channels may be prerecorded in the test device or configured by the user. For example, it may define a set of wavelengths at which a transmission light signal can be expected in accordance with the network configuration or may simply include all the ITU channels.

In step 504, measured optical power values as obtained from the WDM power measurement are then compared to a power level threshold in order to identify any problematic channel within the live channel(s) present on the optical fiber link. If the optical power meets the decision criteria of all live channels, i.e. are greater or equal to a power level threshold, the identified channels are considered pass and there is typically no need for further investigation of the physical layer. The test method then ends and the results may be displayed or otherwise output to the user. However, if the measured optical power value does not meet the decision criteria for at least one live channel, i.e. is less than the power level threshold, then this channel is considered fail and further investigation may be needed.

Accordingly, at least one OTDR acquisition is launched (step 506) based upon a determination that the optical power value measured for at least one live WDM channel is less than said power level threshold.

In one embodiment, the OTDR measurement may be launched upon a determination that one or more of the live WDM channels do not meet the pass-fail criterion, whereas, in another embodiment, the OTDR measurement may be launched upon a determination that all WDM channels do not meet the pass-fail criterion.

FIG. 6B shows step 506 in more detail in accordance with one embodiment that uses a tunable OTDR. In other embodiments and as explained hereinabove with reference to FIG. 5, the method of FIG. 6A may also be implemented using a non-tunable out-of-band OTDR.

Back to FIG. 6B, in step 508, a tuning wavelength of the OTDR module is set to a fail WDM channel for performing at least one OTDR acquisition toward the optical fiber link. In step 510, the OTDR module then performs a check on the optical fiber link, in order to determine if an OTDR acquisition is possible at that wavelength given the presence of a live channel.

In step 512, if the optical power level of light at the selected wavelength from the optical fiber link is lower than a maximum acceptable power level for OTDR acquisition, then at least one OTDR acquisition is launched.

Otherwise, in step 514, the tuning wavelength of the OTDR module is set to a different WDM channel, e.g., a dark channel, and step 510 is repeated until a suitable channel is found.

Figure 7:
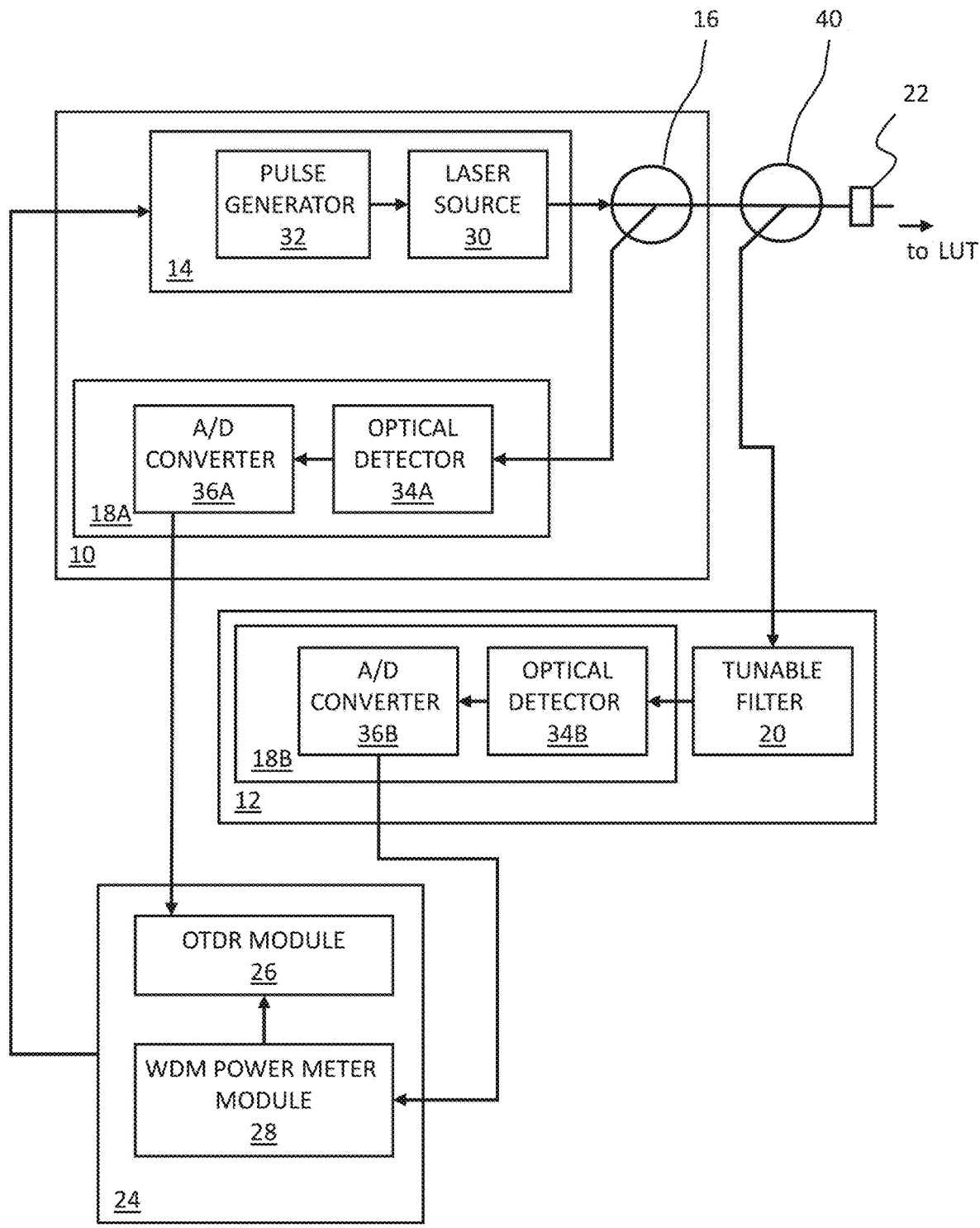
FIG. 7 is a block diagram illustrating a test device in accordance with yet another embodiment wherein an OTDR unit is non-tunable and emits at a wavelength that is outside of the wavelength range of the WDM channels.

FIG. 7 shows yet another embodiment of a test device having dual modes of operation, i.e. as an OTDR and a WDM power meter, provided on a single test port 22. The test device of FIG. 7 comprises components and features that are similar to those of the test devices of FIGS. 1, 2 and 3 and, for more conciseness, such similar components and features are not repeatedly described.

In the embodiment of FIG. 7, the OTDR unit 10 is non-tunable and the emission wavelength of the pulsed laser source 14 is selected to be outside of the wavelength range of the relevant WDM channels for the network under test, such as 1650 nm for example. Although such out-of-band OTDR unit 10 cannot be used to characterize the optical fiber link under test beyond a WDM add/drop multiplexer 74, it can be used to characterize the drop cable 78 as explained hereinabove with reference to FIG. 5.

The OTDR unit 10 of FIG. 7 comprises a laser source 14, a coupler 16 and a detection circuit 18A. The WDM power meter unit 12 comprises a tunable optical filter 20 and a detection circuit 18B. A WDM filter 40 splits the optical signal received from the test port 22 such that light within the wavelength range of the WDM channels (e.g., the C-band, the L-band, etc.) is directed to the WDM power meter unit 12 and light within the wavelength range of the OTDR unit 10 (e.g., around 1650 nm) is directed toward the optical detector 34A of the OTDR unit 10.

It is noted that, in equivalent embodiments, the coupler 16 and the WDM filter 40 can be interchanged such that the coupler 16 is connected toward the test port 22 and the WDM filter 40 is connected to the third port of the coupler 16.

The test device of FIG. 7 may be used to implement some embodiments of the method of FIG. 6 that do not require a tunable OTDR.

Example of test device architecture

Figure 8:
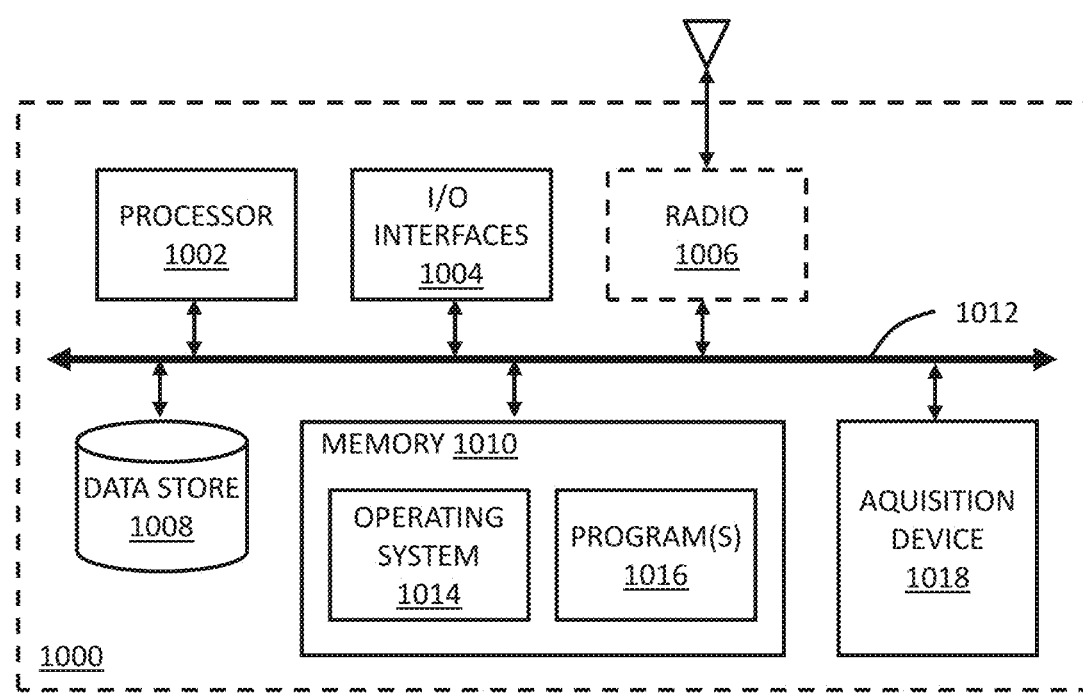
FIG. 8 is a block diagram illustrating an example hardware architecture of the test device of FIG. 1, 2, 3 or 4.

FIG. 8 is a block diagram of a test device 1000 which may embody the test device 100A, 100B, 100C or 200 of FIG. 1, 2, 3 or 4. The test device 1000 may comprise a digital device that, in terms of hardware architecture, generally includes a processor 1002, input/output (I/O) interfaces 1004, an optional radio 1006, a data store 1008, a memory 1010, as well as an optical acquisition device. It should be appreciated by those of ordinary skill in the art that FIG. 8 depicts the test device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the test device 1000 is in operation, the processor 1002 is configured to execute software stored within the memory 1010, to communicate data to and from the memory 1010, and to generally control operations of the test device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the test device 1000.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication.

The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 8, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The programs 1016 may include various applications, add-ons, etc. configured to provide end-user functionality with the test device 1000. For example, example programs 1016 may include a web browser to connect with a server for transferring measurement data files, a dedicated OTDR application configured to control OTDR acquisitions by the acquisition device 1018, set acquisition parameters, analyze OTDR traces obtained by the acquisition device 1018 and display a GUI related to the test device 1000, as well as a dedicated WDM power meter application configured to control WDM power meter acquisitions by the acquisition device 108, set acquisition parameters, analyze power level values obtained by the acquisition device 1018 and display a GUI related to the test device 1000. For example, the dedicated OTDR application may embody an OTDR analysis module configured to analyze acquired OTDR traces in order to characterize the optical fiber link under test, and produce OTDR measurement data files. The dedicated WDM power meter application may embody a WDM power meter analysis module configured to record acquired optical power values associated with a plurality of WDM channels. Example programs 1016 may also include a dedicated test device controller application embodying, e.g. at least part of the test method of FIG. 6.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the test device 1000 via the radio 106. In such cases, at least some of the programs 1016 may be located in a memory of such a mobile device, for execution by a processor of the physically distinct device. The mobile may then also include a radio and be used to transfer measurement data files toward a remote test application residing, e.g., on a server.

It should be noted that the test device shown in FIG. 8 is meant as an illustrative example only. Numerous types of computer systems are available and can be used to implement the test device.

Example of acquisition device architecture

Figure 9:
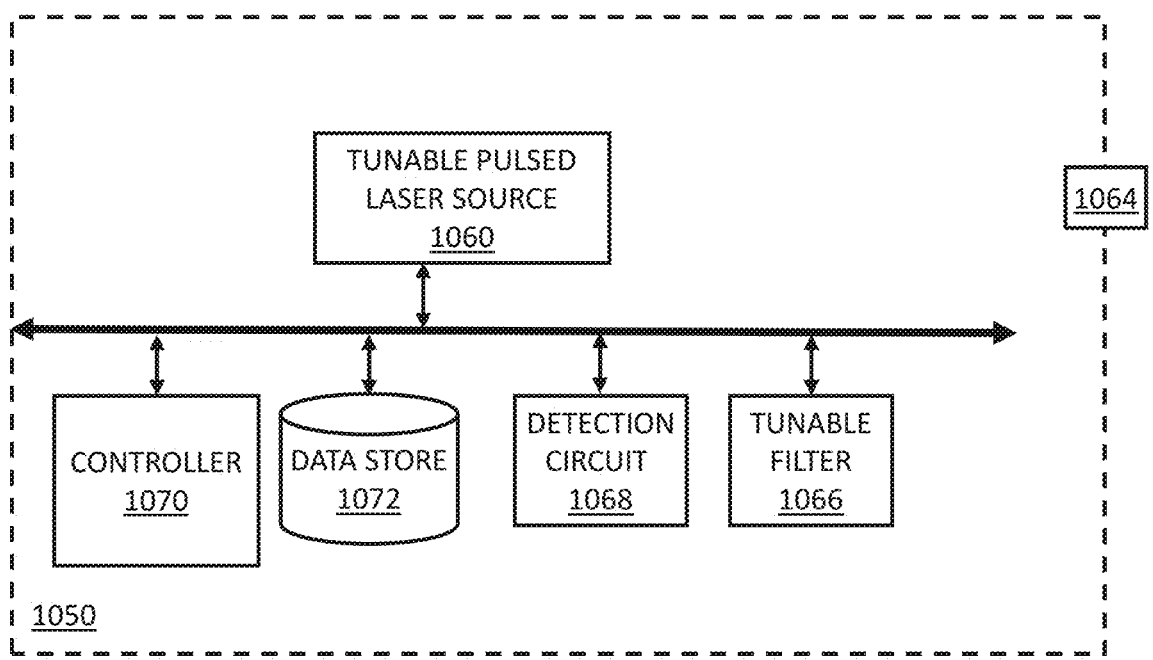
FIG. 9 is a block diagram illustrating an example hardware architecture of an acquisition device of the test device of FIG. 8.

FIG. 9 is a block diagram an embodiment of an acquisition device 1050 which may embody the acquisition device 1018 of the test device 1000 of FIG. 8.

The acquisition device 1050 is connectable toward the tested optical fiber link via an output interface 1064, for performing OTDR acquisitions toward the optical fiber link and WDM power measurement acquisition from the optical fiber link. The acquisition device 1050 comprises optical hardware and electronics as described herein above for performing measurements over an optical fiber link.

The acquisition device 1050 comprises a tunable pulsed laser source 1060, a detection circuit 1068, a tunable optical filter 1066, a coupler (not shown), as well as a controller 1070 and a data store 1072.

The tunable pulsed laser source 1060 is embodied by a tunable laser source driven by a pulse generator as described hereinabove.

The tunable pulsed laser source 1060 is coupled to the output interface 1064 of the OTDR acquisition device 1050 through the coupler having three or more ports. The connections are such that test light pulses generated by the tunable pulsed laser source 1060 are coupled toward the output interface 1064 and that the return light signal arising from backscattering and reflections along the optical fiber link 110 is coupled toward the detection circuit 1068.

As described herein above with reference to FIGS. 1, 2, 3 and 4, the acquisition device 1050 may further comprises a tunable optical filter 1066, connected as shown in FIG. 1, 2, 3 or 4.

The acquisition device 1050, and more specifically the tunable pulsed laser source 1060 and the tunable optical filter 1066 are controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the acquisition device 1050 is in operation, the controller 1070 is configured to control the measurement process. The controller 1070 controls parameters of the tunable pulsed laser source 1060 according to OTDR acquisition parameters that are either provided by the operator of the OTDR software or otherwise determined by program(s) 1016. It also controls parameters of the tunable optical filter 1066 according to parameters set by the operator of the WDM software or otherwise determined by program(s) 1016.

The data store 1072 may be used to cumulate raw data received from the detection circuit 1068, as well as intermediary averaged results and resulting OTDR traces and power measurement values. The data store 908 may include any of volatile memory elements (e.g., random access memory (RAM, such as DRAM, SRAM, SDRAM, and the like)) or the like and it may be embedded with the controller 1070 or distinct.

The OTDR traces and optical power values acquired by the acquisition device 1050 may be received and analyzed by one or more of the computer programs 1016 and/or stored in data store 1008 for further processing.

It should be noted that the architecture of the acquisition device 1050 as shown in FIG. 9 is meant as an illustrative example only. Numerous types of optical and electronic components are available and can be used to implement the acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and some of the data paths illustrated being implemented by data communication within a computer application or operating system. The structure illustrated herein is thus only provided for efficiency of teaching the described embodiment.

The embodiments described above are intended to be exemplary only. The scope of the invention is therefore intended to be limited solely by the appended claims.

The invention claimed is:

1. A test device comprising:
a test port connectable toward an optical fiber link;
a pulsed tunable laser source configured for generating and launching toward the optical fiber link and via said test port, a pulsed test signal within a selected wavelength-division multiplexed (WDM) channel;
a tunable optical filter receiving light from the optical fiber link via said test port and configured to filter out optical power outside of the selected WDM channel before detection;
a detection circuit connected to the tunable filter and configured to detect light from the optical fiber link within the selected WDM channel;
an OTDR module configured to, in an OTDR mode, set an emission wavelength of the pulsed tunable laser source for generating a pulsed test signal in the selected WDM channel, set a center wavelength of the tunable filter within the selected WDM channel and acquire from the detection circuit, an OTDR trace representing backscattered and reflected light as a function of distance in the optical fiber link; and
a WDM power meter module configured to, in a WDM power meter mode, set the center wavelength of the tunable filter within the selected WDM channel and acquire from the detection circuit, an optical power value representing an optical power level of light from the optical fiber link within the selected WDM channel.

2. The test device as claimed in claim 1, wherein the detection circuit comprises an avalanche photodiode and an analog-to-digital converter.

3. The test device as claimed in claim 1, wherein the OTDR module further comprises:
an OTDR analyzing module configured for identifying one or more events along the optical fiber link from at least one of said OTDR trace, and for estimating a value of at least one characteristic associated with each said one or more events.

4. The test device as claimed in claim 1, wherein the WDM power meter module is further configured to repeat the optical power value acquisitions for a plurality of WDM channels.

5. The test device as claimed in claim 4, wherein the WDM power meter module further comprises:
a WDM power meter analyzing module configured for recording acquired optical power values associated with the plurality of WDM channels.

6. The test device as claimed in claim 1, wherein the detection circuit comprises a first photodetector used, in the OTDR mode, to detect a return light signal corresponding to the pulsed test signal as received from the optical fiber link via said test port and filtered by said tunable filter, so as to obtain the OTDR trace representing backscattered and reflected light as a function of distance in the optical fiber link.

7. The test device as claimed in claim 6, wherein said first photodetector is further used, in a WDM power meter mode, to detect an optical power level of light from the optical fiber link within the selected WDM channel.

8. The test device as claimed in claim 6, wherein the detection circuit comprises a second photodetector used, in a WDM power meter mode, to detect an optical power level of light from the optical fiber link within the selected WDM channel.

9. The test device as claimed in claim 6, wherein the first photodetector comprises an avalanche photodiode.

10. The test device as claimed in claim 8, wherein the first photodetector comprises an avalanche photodiode and the second photodetector comprises a p-n junction photodiode.

11. The test device as claimed in claim 10, wherein the second photodetector comprises a PIN photodiode.

12. A test method for testing an optical fiber link using a test device having a WDM power meter module and an OTDR module, the test method comprising:
in an OTDR mode:
setting an emission wavelength of a pulsed tunable laser source for generating a pulsed test signal in a selected wavelength-division multiplexed (WDM) channel;
using the pulsed tunable laser source to generate and launch toward the optical fiber link, a pulsed test signal within a selected WDM channel, via a test port connectable toward the optical fiber link;
setting a center wavelength of a tunable filter within the selected WDM channel;
using the tunable optical filter receiving light from the optical fiber link via said test port, to filter out optical power outside of the selected WDM channel before detection; and
using a detection circuit connected to the tunable filter to acquire an OTDR trace representing backscattered and reflected light as a function of distance in the optical fiber link; and
in a WDM power meter mode:
setting the center wavelength of the tunable filter within the selected WDM channel;
using the tunable optical filter receiving light from the optical fiber link via said test port, to filter out optical power outside of the selected WDM channel before detection; and
in absence of the pulsed test signal, using a detection circuit connected to the tunable filter to acquire an optical power value representing an optical power level of light from the optical fiber link within the selected WDM channel.

13. The test method as claimed in claim 12, further comprising:
in the OTDR mode:
identifying one or more events along the optical fiber link from at least one of said OTDR trace, and
estimating a value of at least one characteristic associated with each said one or more events.

14. The test method as claimed in claim 12, further comprising:
in the WDM power meter mode:
repeating the optical power value acquisitions for a plurality of WDM channels; and
recording acquired optical power values associated with the plurality of WDM channels.

15. The test method as claimed in claim 12, further comprising:
   in the OTDR mode: detecting return light signal corresponding to the pulsed test signal as received from the optical fiber link via said test port and filtered by said tunable filter using a first photodetector and a first analog-to-digital converter, so as to obtain the OTDR trace representing backscattered and reflected light as a function of distance in the optical fiber link.

16. The test device as claimed in claim 15, further comprising:
   in the WDM power meter mode: detecting an optical power level of light from the optical fiber link within the selected WDM channel using a second photodetector and a second analog-to-digital converter.

17. The test method as claimed in claim 12, further comprising:
   in the OTDR mode: detecting return light signal corresponding to the pulsed test signal as received from the optical fiber link via said test port and filtered by said tunable filter using an avalanche photodetector and a first analog-to-digital converter, so as to obtain the OTDR trace representing backscattered and reflected light as a function of distance in the optical fiber link.

18. The test device as claimed in claim 15, further comprising:
   in the WDM power meter mode: detecting an optical power level of light from the optical fiber link within the selected WDM channel using a p-n junction photodetector and a second analog-to-digital converter.

19. A test method for testing an optical fiber link using a test device having a WDM power meter module and an OTDR module, the method comprising:
   using the WDM power meter module:
      for each of a set of WDM channels, measuring an optical power value representing an optical power level of light from the optical fiber link within the corresponding WDM channel;
      comparing measured optical power values to a power level threshold;
      based upon a determination that the optical power value measured for at least one WDM channel is not null and is less than said power level threshold:
         the OTDR module performing at least one OTDR acquisition toward the optical fiber link to acquire an OTDR trace representing backscattered and reflected light as a function of distance in the optical fiber link.

20. The test method as claimed in claim 19, wherein the OTDR module is tunable and wherein a tuning wavelength of the OTDR module is set to said at least one WDM channel for performing said at least one OTDR acquisition.

21. The test method as claimed in claim 19, wherein the OTDR module is tunable and, upon a determination that the optical power level of light from the optical fiber link is greater than an acceptable power level for OTDR acquisition, setting a set wavelength of the OTDR module to a WDM channel that is different from said at least one WDM channel for performing said at least one OTDR acquisition.

22. The test method as claimed in claim 19, wherein the OTDR module comprises a pulsed laser source having an emission wavelength that is outside of a wavelength range of the WDM channels and wherein said OTDR acquisition is performed at said emission wavelength.

23. The test method as claimed in claim 19, wherein the optical fiber link is connected to a single test port for both a) measuring an optical power value and b) performing at least one OTDR acquisition.

24. The test method as claimed in claim 19, wherein the OTDR module performs at least one OTDR acquisition based upon a determination that the optical power value measured is less than said power level threshold for all WDM channels where the optical power value is not null.

* * * * *